US008528961B2

(12) United States Patent
Beck et al.

(10) Patent No.: US 8,528,961 B2
(45) Date of Patent: Sep. 10, 2013

(54) ELECTRIC SWING PLUG DOOR OPERATOR WITH AUXILIARY DOOR LOCKING MECHANISM

(75) Inventors: Gregory S. Beck, Templeton, CA (US); Fotios Golemis, Skokie, IL (US); Rodrigo E. Guajardo, Chicago, IL (US)

(73) Assignee: Wabtec Holding Corp., Wilmerding, PA (US)

( * ) Notice: Subject to any disclaimer, the term of this patent is extended or adjusted under 35 U.S.C. 154(b) by 573 days.

(21) Appl. No.: 12/676,986

(22) PCT Filed: Sep. 29, 2008

(86) PCT No.: PCT/US2008/078092

§ 371 (c)(1), (2), (4) Date: May 26, 2010

(87) PCT Pub. No.: WO2009/042992

PCT Pub. Date: Apr. 2, 2009

(65) Prior Publication Data

US 2010/0319261 A1 Dec. 23, 2010

Related U.S. Application Data

(60) Provisional application No. 60/995,858, filed on Sep. 28, 2007.

(51) Int. Cl.
*B60J 5/00* (2006.01)

(52) U.S. Cl.
USPC .......... 296/146.6

(58) Field of Classification Search
USPC .......... 296/146.4
See application file for complete search history.

(56) References Cited

U.S. PATENT DOCUMENTS

| | | | |
|---|---|---|---|
| 843,598 | A | 2/1907 | Greeson |
| 1,354,787 | A | 10/1920 | Voina-Hansen |
| 1,650,332 | A | 11/1927 | Dobson |
| 2,893,506 | A | 7/1959 | Daugirdas |
| 3,035,862 | A | 5/1962 | Phelps |
| 3,318,048 | A | 5/1967 | Odend'Hal |
| 3,332,169 | A | 7/1967 | Lohr et al. |
| 3,403,432 | A | 10/1968 | Bencene |
| 3,713,472 | A | 1/1973 | Dozois |
| 3,715,931 | A | 2/1973 | Littmann |
| 3,716,945 | A | 2/1973 | Cooper et al. |

(Continued)

FOREIGN PATENT DOCUMENTS

| | | | |
|---|---|---|---|
| DE | 3606924 | A1 | 9/1987 |
| DE | 19937406 | A1 | 2/2001 |

(Continued)

*Primary Examiner* — H Gutman
(74) *Attorney, Agent, or Firm* — The Webb Law Firm

(57) ABSTRACT

The invention is directed to an electric swing plug door operator with a remotely powered auxiliary lock mechanism, door striker, catch and manual release system for use on light to medium duty shuttle or utility vehicles. The swing plug door system includes a door operator and base plate assembly, a shaft and arm assembly, a guide rod assembly, a lower shaft pivot, a door panel with a leading edge catch and lock striker assembly, an auxiliary lock and a manual release cable. The auxiliary lock assembly includes a lock bar engaging the lock striker mounted to the trailing edge of the door panel when the door reaches the fully closed position. The door operator includes a manual release lever and gear motor subassembly to drive the door system linkage and to manually disengage the door linkage and lock assembly to gain manual egress from the vehicle.

7 Claims, 6 Drawing Sheets

(56) References Cited

U.S. PATENT DOCUMENTS

| | | | |
|---|---|---|---|
| 4,020,594 | A | 5/1977 | Ceyer |
| 4,087,939 | A | 5/1978 | Elguindy et al. |
| 4,134,231 | A | 1/1979 | Daugirdas et al. |
| 4,178,857 | A | 12/1979 | Madland |
| 4,198,786 | A | 4/1980 | Monot |
| 4,282,686 | A | 8/1981 | Britzke et al. |
| 4,290,368 | A | 9/1981 | Mazzini |
| 4,375,140 | A | 3/1983 | Blair et al. |
| 4,490,941 | A | 1/1985 | Mamach |
| 4,493,499 | A | 1/1985 | Stenglein |
| 4,756,563 | A | 7/1988 | Garwood et al. |
| 4,775,178 | A | 10/1988 | Boyko |
| 4,833,827 | A | 5/1989 | Bode et al. |
| 4,924,625 | A | 5/1990 | Dilcher |
| 4,926,975 | A | 5/1990 | Morris |
| 4,932,715 | A | 6/1990 | Kramer |
| 5,066,056 | A | 11/1991 | Schap |
| 5,148,631 | A | 9/1992 | Bayard et al. |
| 5,228,239 | A | 7/1993 | Heo |
| 5,263,280 | A | 11/1993 | Dilcher |
| 5,317,934 | A | 6/1994 | Zannis |
| 5,332,279 | A | 7/1994 | Golemis et al. |
| 5,421,395 | A | 6/1995 | Horn |
| 5,429,400 | A | 7/1995 | Kawaguchi et al. |
| 5,456,504 | A | 10/1995 | Brillant |
| 5,642,909 | A | 7/1997 | Swan et al. |
| 5,755,468 | A | 5/1998 | Buchanan, Jr. |
| 5,913,563 | A | 6/1999 | Watanabe et al. |
| 6,021,871 | A | 2/2000 | Grabner |
| 6,039,364 | A | 3/2000 | Rieger et al. |
| 6,122,863 | A | 9/2000 | Tippin et al. |
| 6,202,350 | B1 | 3/2001 | Montgomery et al. |
| 6,217,097 | B1 | 4/2001 | Rogers, Jr. et al. |
| 6,241,300 | B1 | 6/2001 | Suzuki |
| 6,256,928 | B1 | 7/2001 | Skeem |
| 6,336,294 | B1 | 1/2002 | Kowalczyk et al. |
| 6,708,449 | B2 | 3/2004 | Stojc |
| 2002/0178654 | A1 | 12/2002 | Pagowski |
| 2003/0089041 | A1 | 5/2003 | Daniels et al. |
| 2003/0205000 | A1 | 11/2003 | Pagowski |
| 2005/0132652 | A1 | 6/2005 | Tong et al. |

FOREIGN PATENT DOCUMENTS

| | | | |
|---|---|---|---|
| FR | 2443942 | A1 | 7/1980 |
| FR | 2608664 | A1 | 6/1988 |
| FR | 2772063 | A1 | 6/1999 |

ELECTRIC SWING PLUG DOOR OPERATOR WITH AUXILIARY DOOR LOCKING MECHANISM

CROSS REFERENCE TO RELATED APPLICATIONS

This application claims the benefit of U.S. Provisional Patent Application No. 60/995,858, filed Sep. 28, 2007, and entitled "Electric Swing Plug Door Operator with Auxiliary Door Locking Mechanism", the entire disclosure of which is incorporated herein in its entirety.

BACKGROUND OF THE INVENTION

1. Field of the Invention

The present invention relates to electrically powered door operating equipment used to open and close doors on a variety of light and medium duty shuttle and utility buses. Specifically, the present invention relates to an electric swing plug door operator with a remotely powered auxiliary lock mechanism, door striker, catch, and manual release arrangement adapted for use with medium duty shuttle and utility vehicles.

2. Description of Related Art

Various types of door closing systems are known. Examples of these known systems are described in U.S. Pat. Nos. 4,282,686; 4,924,625 and 5,263,280.

A particular door closing system is the pneumatic rotary operator, which employs a double acting cylinder driving a set of cam followers that ride along opposing helical cam surfaces to convert linear motion to rotational motion. The helical cam surfaces are machined on inner and outer cylindrical nested sleeves. The outer helix is fixed relative to the bus structure while the inner helix, along with a spindle, can rotate. This type of operator employs a spindle lock feature that constrains the rotary drive's spindle from rotating when the drive cam followers are in the fully locked position. The locking feature is a vertical notch that is integral with the outer, stationary helix sleeve. In the fully locked position, the cam followers are driven, under pressure, into the notch transition to constrain the spindle from rotating. This locking method does not engage and lock the door directly and is very sensitive to proper door alignment with the portal opening as well as proper door preload adjustment. The operator may close the door but will not reach the locked position of the door if these adjustments are not executed correctly. Furthermore, if this system should experience sudden loss of air pressure due to an air system component failure, the operator will inadvertently unlock allowing a passenger to push the door or doors manually.

Another known door closing system is the pneumatic rotary operator with a lift and lock feature, which converts the linear motion of a double acting pneumatic cylinder to rotary motion using an opposing helix arrangement similar to the pneumatic rotary operator arrangement discussed above. A differentiating feature of the pneumatic rotary operator with the lift and lock feature is its ability to stop spindle rotation and translate the door panel and associated linkage vertically by approximately 10 mm once the door reaches its closed position. A series of wedges on the door panel leading and trailing edges, engage with corresponding wedges on the door portal as the door is raised to lock the door. Although this method locks the door directly, proper operation of this system relies substantially on proper door panel alignment with the portal opening. Furthermore, should this system experience a sudden loss of air pressure due to an air system failure, the operator will allow the door to drop, thus disengaging the locking wedges and allowing a passenger to manually push the door or doors open. Another potential shortcoming of this design is possible binding of the locking wedges in the door-closed position caused by improper door alignment, plastic deformation, or elastic deformation of the portal opening. Structural deformation of the portal opening may occur when the vehicle is loaded with passengers or if the vehicle sustains collision damage in the general area of the doorway. The binding of the locking wedges may prevent a passenger from manually opening the door or doors in an emergency.

A further known door opening system is the electric rotary operator with a lift and lock feature. Similar to the pneumatic rotary operator with the lift and lock feature discussed above, electric rotary operators with the lift and lock feature employ an electric motor to drive the spindle instead of a double acting pneumatic cylinder. Potential shortcomings of this design also include sensitivity to door panel adjustment, in addition to the binding of the locking wedges in the door-closed position caused by elastic or plastic deformation of the portal opening.

Other types of electric rotary door operators for controlling the opening and closing of doors of multi-passenger mass transit vehicles are shown in United States Patent Application Publication Nos. 2002/0178654 and 2003/0205000. These systems include a series of gears and linkages driven by an electric motor to open and close the door. A locking system is provided on the rotary operator wherein this rotary operator includes a gear pinion that can be disengaged from the gear sector of the rotary operator to allow for unlocking of the door, enabling manual egress from the vehicle. These systems are susceptible to many of the shortcomings discussed above in relation to other types of door operating systems.

SUMMARY OF THE INVENTION

It is therefore an object of the invention to provide for the positive locking of a door panel with minimal sensitivity to door panel alignment and preload adjustment. It is a further object of the invention to provide for the closure of the door panel in a positively locked state in the event of disruption of power to the door system or a single point failure involving any of the door operator drive and linkage components. It is another object of the invention to provide a release for the lock mechanism to allow personnel to manually egress from the vehicle.

Accordingly, the present invention is directed to an electric swing plug door operator with a remotely powered auxiliary lock mechanism, door striker, catch and manual release system for use on light to medium duty shuttle or utility vehicles. The swing plug door system includes a door operator and base plate assembly, a shaft and arm assembly, a guide rod assembly, a lower shaft pivot, a door panel with a leading edge catch and lock striker assembly, an auxiliary lock and a manual release cable. The door operator and base plate assembly is affixed to the vehicle structure directly above the portal. The shaft and arm assembly is affixed to the door operator drive linkage and can rotate about an axis defined by the base plate shaft bearing and the lower shaft pivot. The guide rod assembly, including a guide rod, controls the angular orientation of the door panel as it opens and closes relative to the side of the vehicle. One end of the guide rod is attached to the door operator base plate and the other end of the guide rod is attached to the door panel via a guide rod-mounting bracket. A catch mounted to the leading edge of the door panel engages a catch pad mounted to the vehicle portal opening as the door panel nears its fully closed position and constrains lateral displacement of the leading edge of the door panel in its fully closed and locked position. The lock assembly includes a lock bar, which is deployed by a lock motor to engage the lock striker mounted to the trailing edge of the door panel when the door reaches the fully closed position. The door operator includes a manual release lever and gear motor subassembly to provide a means to drive the door system linkage and to manually disengage the door linkage and lock assembly to gain manual egress from the vehicle.

According to one aspect, the invention is directed to an auxiliary lock mechanism for use with an electric swing plug door operator for locking and unlocking a vehicle door. The auxiliary lock mechanism includes a lock assembly mounting bracket for mounting the lock mechanism to the vehicle, an auxiliary manual release lever associated with the lock assembly, and an attachment member for attaching the auxiliary manual release lever to a ball cage providing an axis of rotation of the auxiliary manual release lever. This attachment member can be a pivot bolt which is adapted for providing an axis of rotation for the auxiliary manual release lever. A cam is mounted to a base plate of the vehicle. The cam is adapted for opening and closing the vehicle door and includes a cam surface associated with the auxiliary manual release lever. This cam surface is adapted for displacing a ball bearing during rotation of the auxiliary manual release lever to an unlock position. A biasing member, such as a torsion spring, is provided having a first end associated with a ball cage and a second end associated with the auxiliary manual release lever to bias the auxiliary manual release lever to a normal locked position. A locking bar is adapted for movement toward and away from the vehicle door. This locking bar includes an engagement member on an end portion. An auxiliary motor is provided for driving the locking bar toward the door and bringing the engagement member into contact with a receiving member, such as a striker, mounted on the vehicle door to lock the vehicle door. A return member is provided for retracting the locking bar and disengaging the engagement member from the receiving member to unlock the vehicle door. A manual release cable cleavis is secured to an attachment member on the auxiliary manual release lever adapted for rotating the auxiliary manual release lever to the unlock position. A first stop member is provided for stopping rotation of the auxiliary manual release lever during rotation to an unlock position and a second stop member is provided for stopping rotation of the auxiliary manual release lever during rotation to a lock position. According to one embodiment, the auxiliary motor for driving the locking bar can be a gear motor pinion adapted for engaging the locking bar and includes an internal clutch linking the motor drive to a motor output shaft. This clutch is adapted for disengagement by displacing the motor output shaft axially towards the motor housing to allow for free rotation of the gear motor pinion during a manual release of the locking mechanism. The locking bar includes a return spring for retracting the locking bar to an unlocked position. The locking bar also includes at least one bearing pad and at least one washer plate to provide linear guidance of the locking bar and distribute loads from the locking bar to the mounting bracket. The receiving member on the vehicle door comprises a lock striker assembly and the lock mechanism includes an inductive proximity sensor adapted for sensing a target on the lock striker assembly and providing a signal when the engagement member on the locking bar contacts the striker to lock the lock mechanism.

According to another aspect, the invention is directed to an electric swing plug door operator for use on light to medium duty shuttle and utility vehicles. The plug door operator includes a door operator having a drive linkage, and base plate assembly affixed to the vehicle structure. A shaft and arm assembly is associated with the door operator drive linkage. The shaft and arm assembly is adapted for rotation about a vertical axis and is associated with a vehicle door panel such that rotation thereof causes opening and closing of the vehicle door panel. The door panel is attached to the shaft and arm assembly by a series of ball joint bearings attached to the arms of the shaft and arm assembly. The ball joint bearings allow a rotational degree of freedom of the door and establish the axis of rotation of the door relative to the shaft and arm assembly. A guide rod assembly is associated with the door operator and is adapted for controlling the angular orientation of the vehicle door panel with respect to a side of the vehicle during opening and closing. The guide rod assembly has an adjustable length so as to bias a leading edge of the door panel slightly closer to the side of the vehicle than the trailing edge during opening and closing. A catch is mounted to a leading edge of the vehicle door panel adapted for engaging a catch pad mounted to a vehicle portal opening. The catch is adapted to constrain lateral displacement of the door panel leading edge in an outboard direction when the door panel is in a fully closed and locked position. The door operator also includes a remotely powered auxiliary lock mechanism. The auxiliary lock mechanism includes a locking bar adapted for deployment to engage a lock striker mounted to the door panel trailing edge once the door reaches the fully closed position, and an inductive proximity sensor for sensing a target on the lock striker and stopping deployment of the locking bar. A manual release assembly is also provided which includes a manual release cable associated with the door operator and the auxiliary lock mechanism.

According to still another aspect, the invention is directed to a door operator for use with an electric swing plug door operator for opening and closing a door of a utility vehicle. The door operator includes a prime mover associated with a sector gear for initiating an opening and closing sequence and a door shaft lever associated with a shaft and arm assembly and adapted for transferring a torque to the shaft and arm assembly. The shaft and arm assembly is associated with the vehicle door for opening and closing the door. A connecting rod assembly is associated with the prime mover and the door shaft lever for transferring a force from the primer mover to the door shaft assembly. A manual release cable and a manual release cable mount is provided on the operator for securing an outer sheath of the manual release cable to the operator such that a force applied to the manual release cable initiates an unlocking sequence in an auxiliary lock mechanism. Additionally, a base plate is provided for mounting the door operator to the vehicle. The prime mover includes a gear motor, gear motor output shaft and pinion and the operator further includes a manual release lever adapted for manually disengaging the gear motor output shaft and pinion from a gear train of the gear motor to allow for free rotation of the pinion and sector gear for emergency opening of the door. The manual release lever is adapted for applying a force to the manual release cable. The pinion of the gear motor is adapted for engaging and driving the sector gear. The gear motor subassembly includes an internal clutch linking the drive of the gear motor to an output shaft of the gear motor wherein disengagement of the clutch is achieved by displacing the motor output shaft axially towards the motor housing thus allowing for the free rotation of the pinion of the gear motor. Limit switches are affixed to the base plate for indicating the positioning of the sector gear, door shaft lever and connecting rod assembly.

According to yet another aspect, the invention is directed to a manual release lever and gear motor subassembly for opening a door of a utility vehicle. The utility vehicle includes linkage for opening and closing the door. The manual release subassembly, including a manual release lever associated with the door operator and a gear motor subassembly adapted for disengaging the door opening and closing linkage to allow for manual opening of the vehicle door. The subassembly, including a cam assembly associated with the manual release lever, a manual release mounting bracket, a ball cage housing a ball bearing, a gear motor and a mounting member for mounting the manual release lever to the subassembly. The manual release lever includes a lever, a cam and a cable cleavis mounting hole.

According to another aspect, the invention is directed to a method of manually unlocking and opening the outswing plug door of a utility vehicle. The method includes providing a door operator and base plate assembly affixed to the vehicle structure, wherein the door operator includes a drive linkage and a manual release lever associated therewith. The manual release lever includes a manual release mounting bracket, a ball cage housing a ball bearing, a gear motor, a cam assembly and a cable cleavis mounting hole. The method also further includes providing a shaft and arm assembly associated with the door operator drive linkage, providing a remotely powered auxiliary lock mechanism, and providing a manual release cable extending from said cable cleavis mounting hole to the auxiliary lock mechanism, wherein the auxiliary lock mechanism includes an auxiliary manual release lever, an auxiliary gear motor assembly having a clutch and a locking bar. The shaft and arm assembly is adapted for rotation about a vertical axis and is associated with a vehicle door panel such that rotation thereof causes opening and closing of the vehicle door panel. The method also includes actuating the manual release lever and cam assembly to cause displacement of the ball bearing to cause free rotation of a shaft of the gear motor and to displace the manual release cable and apply a force adapted for rotating the auxiliary manual release lever to disengage the clutch of the gear motor assembly allowing the lock bar to retract to an unlock position. According to the method, displacement of the ball bearing in the door operator occurs in an axial direction with respect to the gear motor shaft and pinion to disengage the gear motor clutch resulting in free rotation of the gear motor shaft and pinion. Additionally, the auxiliary manual release lever has a cam surface which upon rotation thereof displaces a ball bearing to depress the gear motor shaft and pinion to disengage the clutch of the auxiliary gear motor allowing for free rotation of the auxiliary lock mechanism pinion. The method further includes providing a lock bar spring to cause the lock bar to move to an unlock position upon disengagement of the gear motor clutch and providing the door operator manual release lever with a detent cam adapted for engaging a manual release detent mounted on the door operator assembly to maintain the manual release lever and drive linkage in an unlock position upon actuation of the operator manual release lever.

Further details and advantages of the invention will become clear upon reading the following detailed description in conjunction with the accompanying drawing figures, wherein like parts are designated with like reference numerals throughout.

BRIEF DESCRIPTION OF THE INVENTION

For purposes of the description hereinafter, spatial orientation terms, if used, shall relate to the referenced embodiment as it is oriented in the accompanying drawing figures or otherwise described in the following detailed description. However, it is to be understood that the embodiments described hereinafter may assume many alternative variations and embodiments. It is also to be understood that the specific devices illustrated in the accompanying drawing figures and described herein are simply exemplary and should not be considered as limiting.

Figure 1:
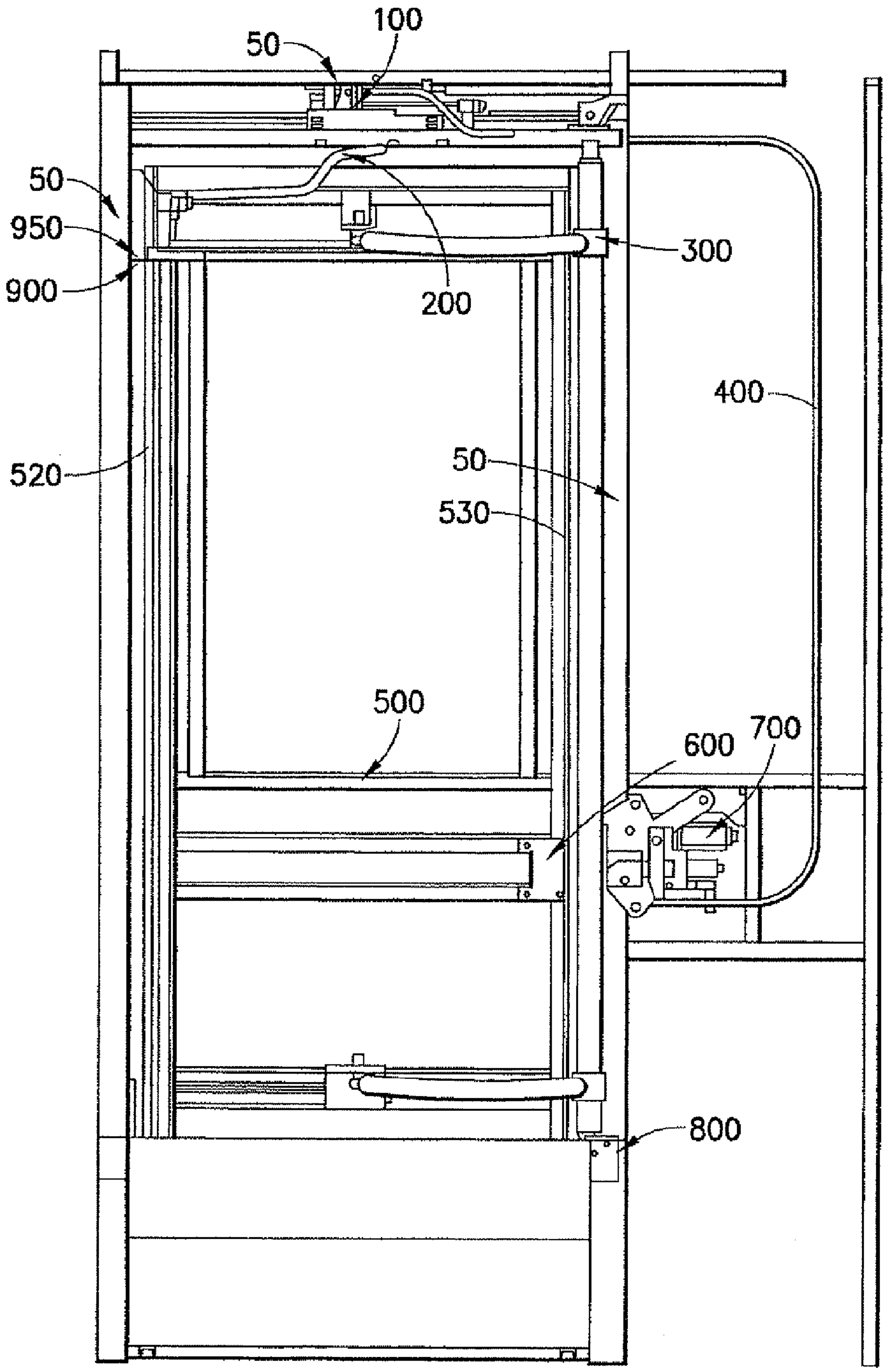
FIG. 1 is a front view of an electric swing plug door system with an auxiliary lock according to one embodiment of the present invention.
Figure 2:
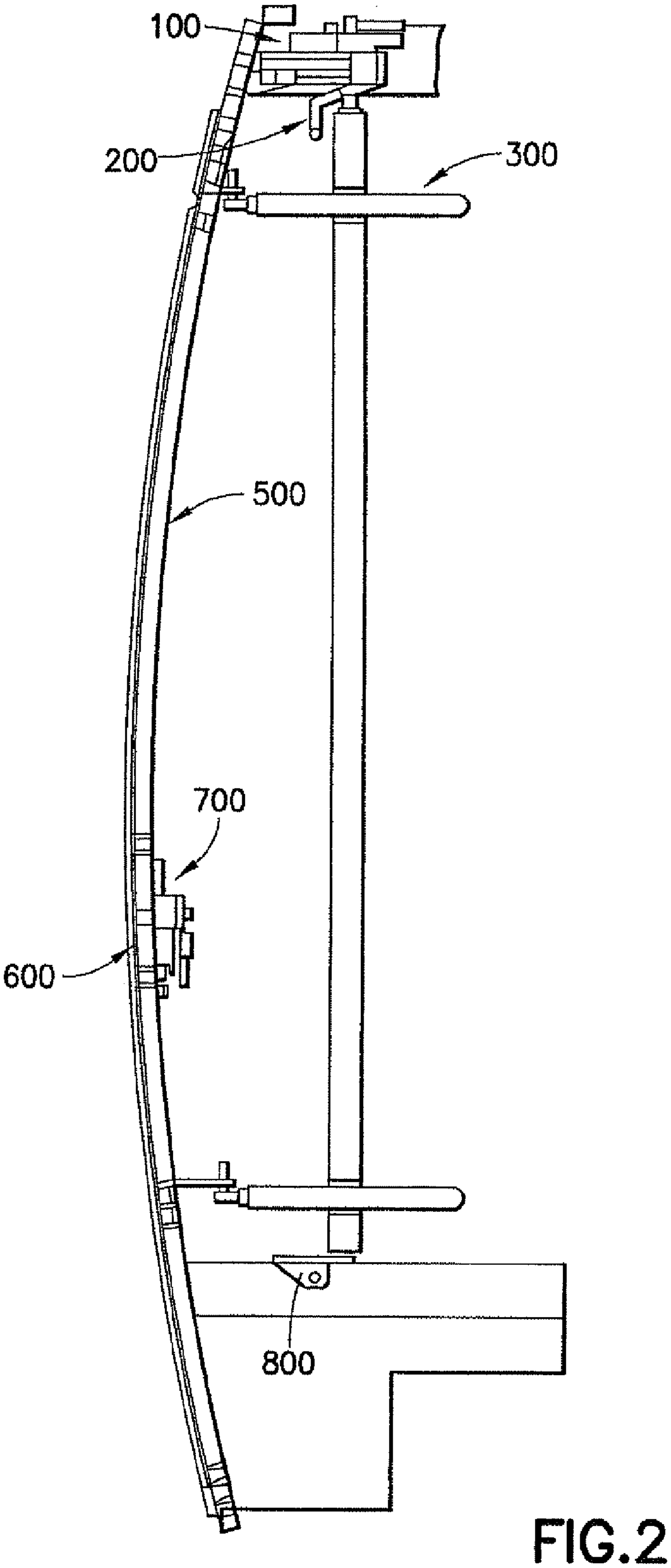
FIG. 2 is a side view of the system show in FIG. 1.

As generally shown in FIGS. 1-2, the swing plug door system of the invention includes a door operator and base plate assembly 100, a shaft and arm assembly 300, a guide rod assembly 200, a lower shaft pivot 800, a door panel 500 with a leading edge catch 900 and a lock striker assembly 600, an auxiliary lock 700 and a manual release cable 400. The embodiment shown in FIGS. 1-2 discloses a single panel swing door system adapted to close a vehicle portal structure, generally indicated as 50; however this invention can be adapted for a dual plug door configuration.

The door operator and base plate assembly 100 is affixed to the vehicle structure directly above the door portal 50. The shaft and arm assembly 300 is affixed to the door operator drive linkage and can rotate about an axis defined by base plate shaft bearing 70, shown in FIG. 3, and lower shaft pivot 800. The shaft and arm assembly 300 is constrained from moving along this axis by the door operator and base plate assembly 100. The door panel assembly 500 is attached to shaft and arm assembly 300 via ball joint bearings attached to the arms of the shaft and arm assembly 300. The ball joint bearings allow a rotational degree of freedom of the door panel 500 and establish the axis of rotation of the door panel 500 relative to the shaft and arm assembly 300.

The guide rod assembly 200 controls the angular orientation of door panel 500 as it opens and closes relative to the side of the vehicle. The guide rod 200 includes a turnbuckle with a ball joint bearing at each end. One end of the guide rod 200 is attached to the door operator base plate 100 and the other end of guide rod 200 is attached to the door panel guide rod-mounting bracket. The length of guide rod 200 is adjusted to bias the leading edge 520 of door 500 slightly closer to the side of the vehicle than the trailing edge 530 of door 500 during opening and closing. The leading end catch 900 is mounted to the leading edge 520 of door panel 500 and engages catch pad 950 mounted to the vehicle portal opening as door panel 500 nears its fully closed position. Catch 900 constrains lateral displacement of the door panel leading edge

520 in the outboard direction when the door panel 500 is in its fully closed and locked position.

Figure 6:
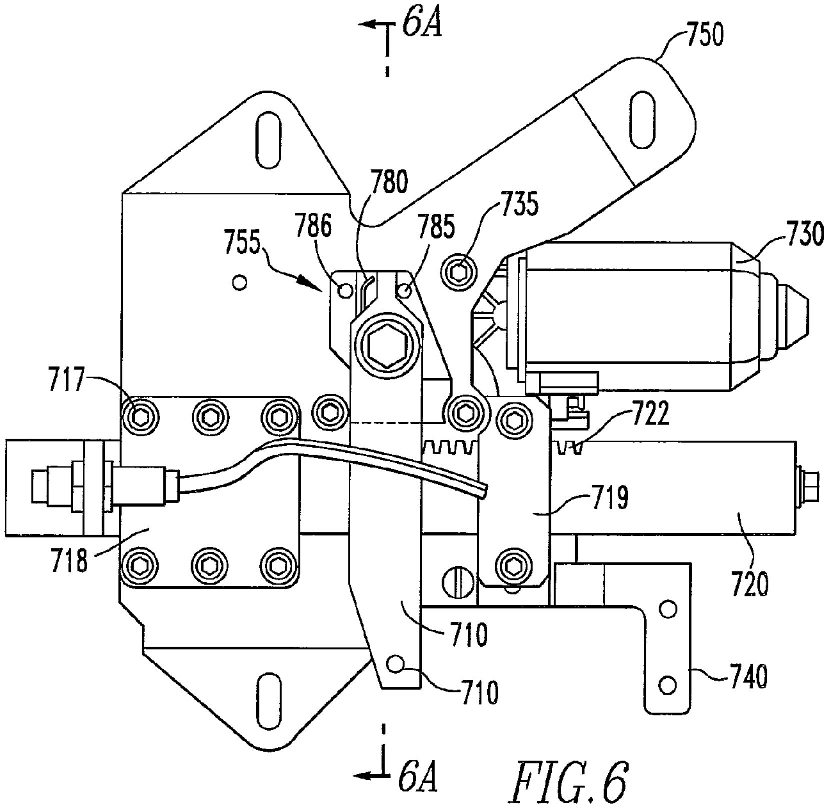
FIG. 6 is a front view and sectional view of the door operator manual release lever and gear motor assembly of the system shown in FIG. 1.

Locking bar 720 of the lock assembly 700, as shown in FIG. 6 and discussed in detail below, is deployed by lock motor 730 to engage lock striker 600 mounted to the trailing edge of door panel 500 once the door reaches the fully closed position. The deployment of lock bar 720 stops when lock assembly inductive proximity sensor 790 senses a target on striker assembly 600.

The door operator and base plate assembly 100, as shown in FIGS. 3-5 and 5B-5C, includes a door operator 1, a door shaft lever 80 that transfers torque to the shaft and arm assembly 300, connecting rod assembly 60 that transfers motion from the door operator 1 to the door shaft lever 80, and a door shaft bearing 70 for transferring the loads imparted by the shaft and arm assembly 300 to the base plate 90. The base plate 90, in turn, provides attachment of the operator 1 to the vehicle structure.

Figure 4:
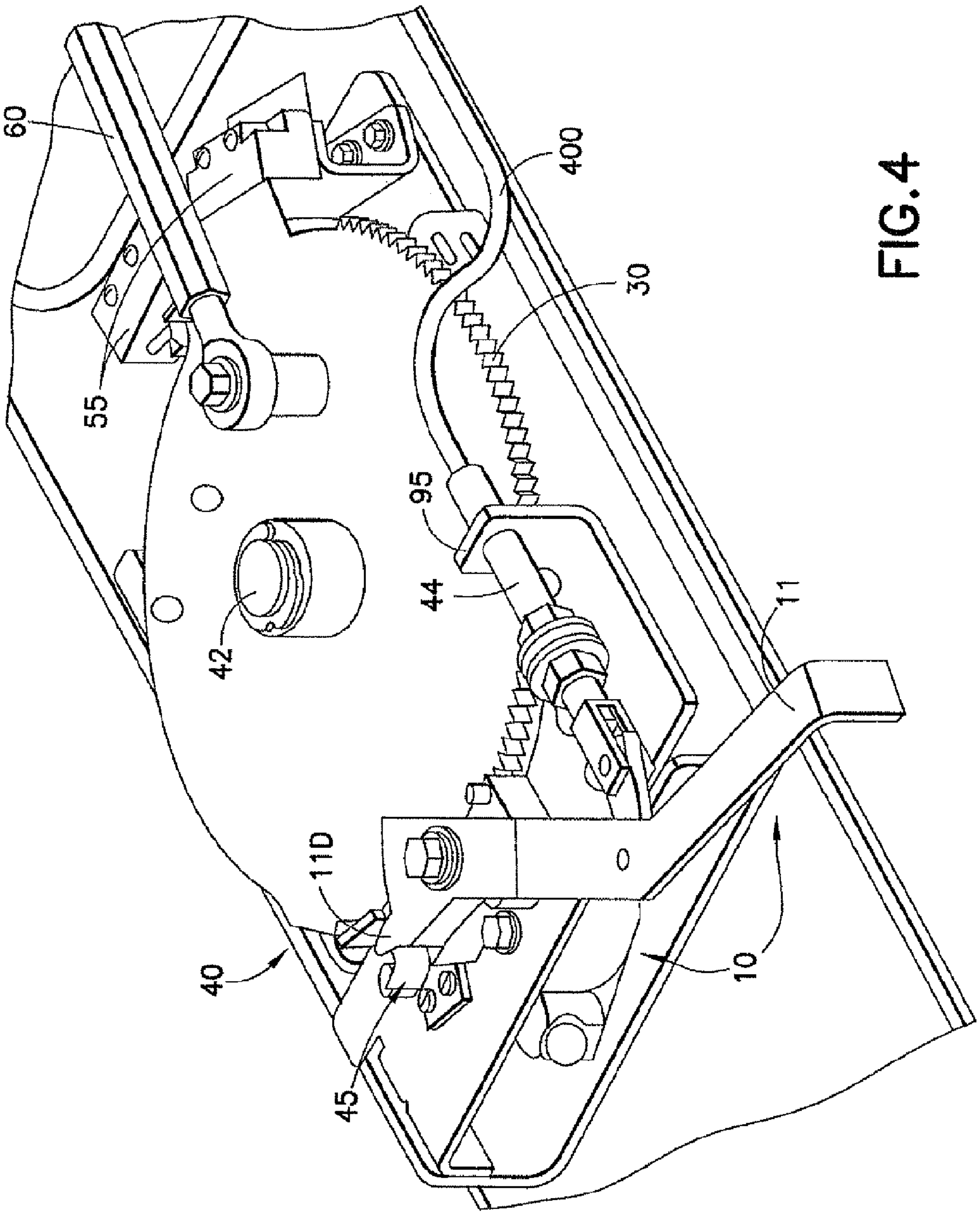
FIG. 4 is a close-up perspective view of the door operator shown in FIG. 3.

As shown in the perspective of the door operator 1 in FIG. 4, a manual release lever and gear motor subassembly, generally illustrated as 10, is provided to manually actuate and/or drive the door system linkage and to manually disengage the door linkage and auxiliary lock assembly 700 to gain manual egress from the vehicle. The gear motor 14 of the gear motor subassembly 10 includes a gear motor pinion 17, shown in FIG. 5B, which engages and drives sector gear 30. In one embodiment, gear motor 14 incorporates an internal clutch linking the motor drive to the motor's output shaft. The clutch can be disengaged by displacing the motor output shaft axially towards the motor housing allowing free rotation of gear motor pinion 17.

As shown in FIG. 4, sector gear 30 rotates about a pin 42 affixed to the door operator mounting plate 40. Door position limit switches 50, 55 indicate the door linkage position and are also affixed to the door operator mounting plate 40 along with the manual release lever and gear motor subassembly 10. A manual release cable mount 95 secures an outer sheath 44 of the manual release cable 400 to the door operator 1.

Figure 5:
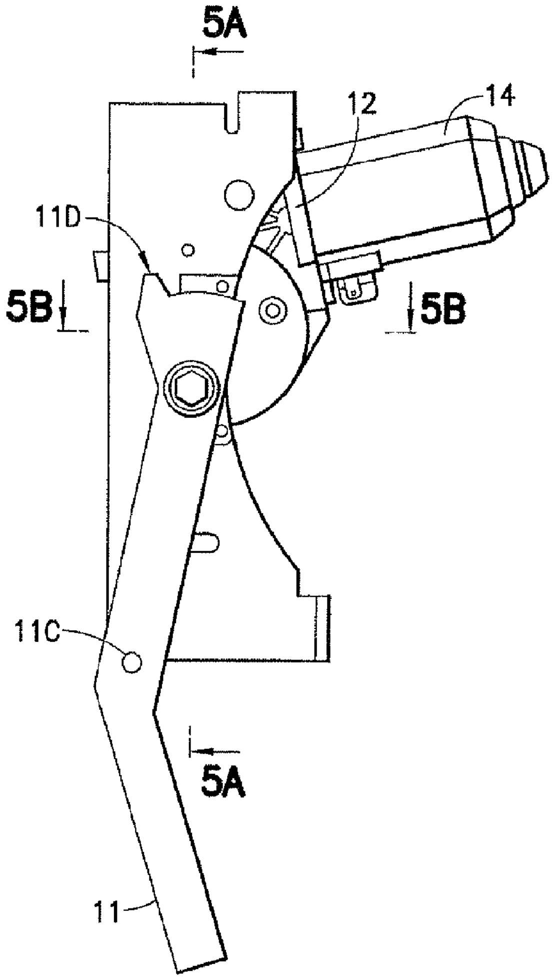
FIG. 5 is a front view of the door operator manual release lever and gear motor assembly of the system shown in FIG. 1.
Figure 5A:
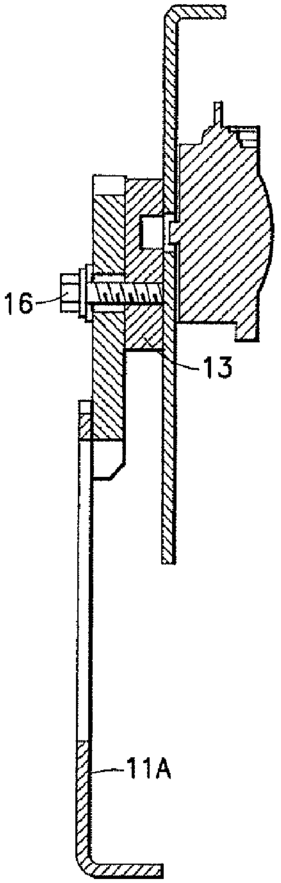
FIG. 5A is a cross-sectional view of the door operator manual release lever and gear motor assembly taken along line A-A of FIG. 5.
Figure 5B:
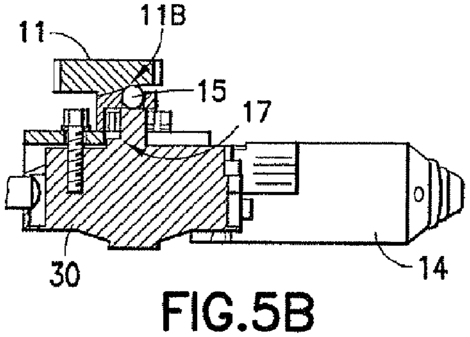
FIG. 5B is a cross-sectional view of the door operator manual release lever and gear motor assembly taken along line B-B of FIG. 5.

The manual release lever and gear motor subassembly 10, as shown in FIGS. 5, 5A, and 5B includes a manual release lever and cam assembly, generally indicated as 11, manual release mounting bracket 12, ball cage 13 which houses ball bearing 15, gear motor 14, and manual release lever mounting bolt 16. The manual release lever 11 includes release lever 11A, cam 11B and manual release cable clevis mounting hole 11C through which the manual release cable 400 extends.

Figure 3:
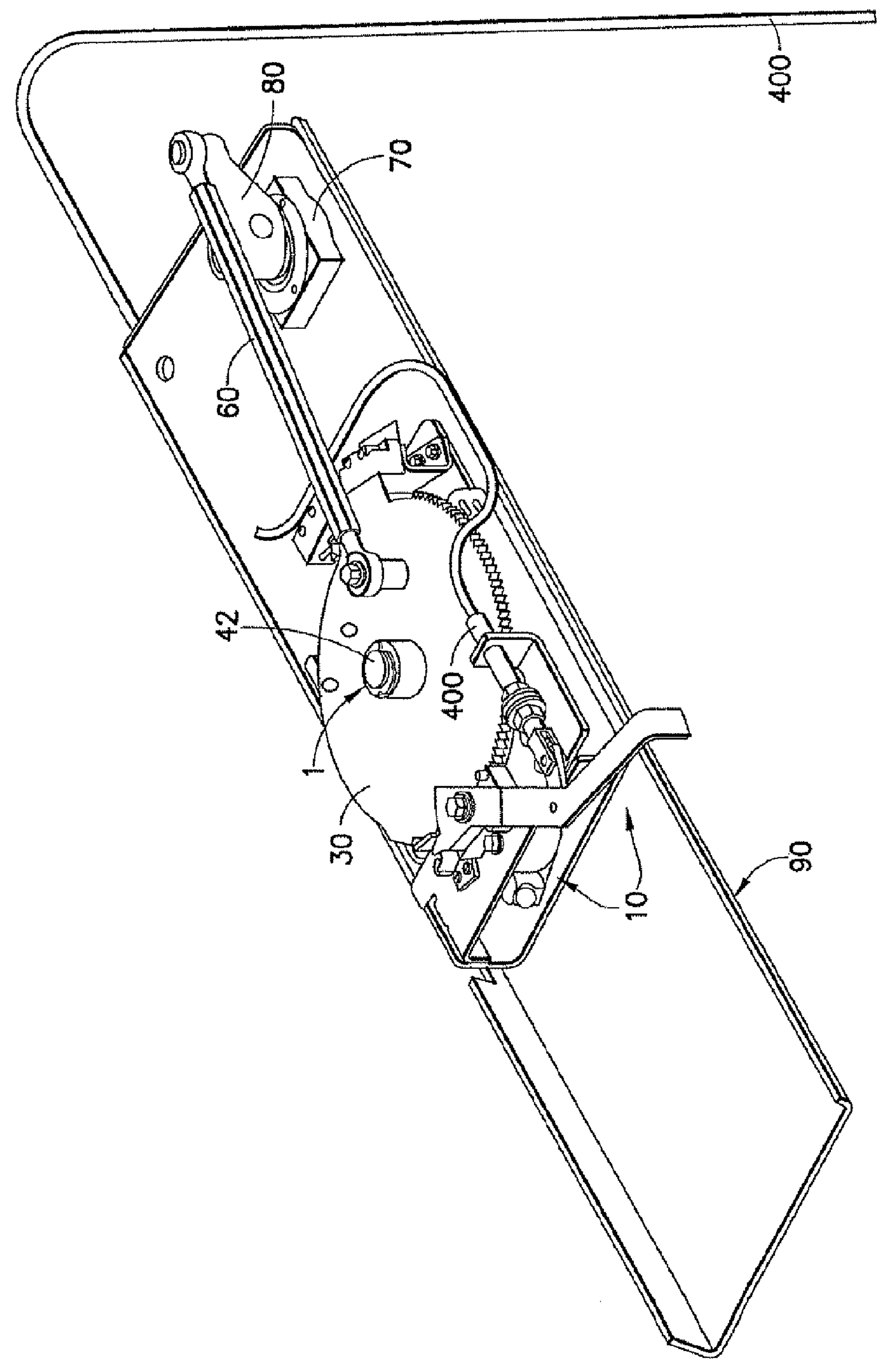
FIG. 3 is a perspective view of a door operator and base plate assembly of the system shown in FIG. 1.

When a valid door open or door closed command is issued by the bus door control system, bus system voltage is applied to gear motor 14. As a result, gear motor pinion 17 rotates to drive sector gear 30 which in turn displaces connecting rod 60, as shown in FIG. 3. Connecting rod 60 drives the door shaft lever 80, thereby applying a torque to the shaft and arm assembly 300 to rotate door panel 500 to the open or closed position. The rotation direction of motor pinion 17, i.e., a clockwise rotation or counterclockwise rotation, is governed by the polarity of the voltage applied to the leads of gear motor 14.

Figure 6A:
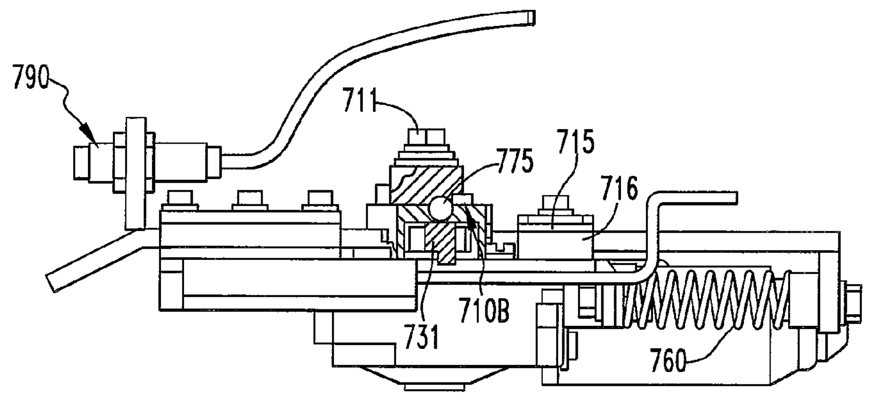
FIG. 6A is a sectional view of the door operator manual release lever and gear motor assembly taken along line A-A of FIG. 6.

The auxiliary door lock assembly 700, shown in FIGS. 6 and 6A, includes an auxiliary lock assembly mounting bracket 750, an auxiliary manual release lever 710, cam surface 710B, pivot bolt 711, torsion spring 780 and an auxiliary electric gear motor 730. The auxiliary lock assembly mounting bracket 750 provides the mounting for the various auxiliary lock assembly components as well as a means for mounting the auxiliary lock assembly 700 to the vehicle structure. An auxiliary manual release lever 710 provides an attachment member 710A for the manual release cable clevis 400. Cam surface 710B axially displaces ball bearing 775 when the auxiliary manual release lever 710 is rotated to the unlock position against a stop pin 786. A pivot bolt 711 retains the auxiliary manual release lever 710 to a ball cage 755 and provides an axis of rotation for the auxiliary manual release lever 710.

A biasing member 780 is provided having a first end associated with the ball cage 755 and a second end associated with the auxiliary manual release lever 710 to bias the auxiliary manual release lever 710 to a normal locked position. According to one embodiment, the biasing member 780 is a torsion spring which engages a groove in the ball cage 755 and the other end engages a groove on the auxiliary manual release lever 710 to bias the auxiliary manual release lever 710 under torsion to a normal position against stop pin 785.

An auxiliary electric gear motor 730 includes gear motor pinion 731 that engages and drives a locking bar 720. The locking bar 720 can include a rack 722. The locking bar 720 is adapted for movement toward and away from the vehicle door and includes an engagement member at the end thereof (not shown) which is adapted for engaging a receiving member or lock striker 600 mounted on the vehicle door to lock the vehicle door. An inductive proximity sensor 790 senses a target on lock striker assembly 600 when in the fully locked position to provide a locked signal.

In one embodiment, the gear motor 730 incorporates an internal clutch linking the motor drive to the motor's output shaft. The clutch can be disengaged by displacing the motor output shaft axially towards the motor housing allowing free rotation of the auxiliary gear motor pinion 731. The door lock assembly 700 further includes locking bar return spring 760, lock bar bearing pads and washer plates 715, 716, 717 and 718, inductive proximity sensor 790 and anchor bracket 740. A return member in the form of a locking bar return spring 760 is provided. Disengagement of the clutch and free rotation of the auxiliary gear motor allows the locking bar return spring 760 to overcome the holding force of the auxiliary gear motor 730 to cause the locking bar 720 to retract to the unlocked position wherein the engagement member of the locking bar 720 is disengaged from the striker assembly 600. This occurs when the manual release lever 11 on the door operator 1 is rotated and a force is applied to cable 400 which, in turn, causes manual release lever 710 to be rotated to the unlock position against stop pin 786. Lock bar bearing pads and washer plates 715, 716, 717 and 718 provide linear guidance of lock bar 720 and distribute loads from lock bar 720 to mounting bracket 750. An anchor bracket 740 secures the outer sheath 44 of manual release cable 400 to the auxiliary door lock assembly 700.

During manual release operation of the door in the fully closed and locked position, manual release lever and cam assembly 11 must be actuated. During actuation, lever cam 11B displaces ball bearing 15 axially toward the gear motor housing, which in turn depresses gear motor shaft and pinion 17 to disengage the gear motor's clutch, allowing for free rotation of gear motor shaft and pinion 17. Simultaneously, manual release lever 11 displaces manual release cable 400 which applies a force to rotate manual release lever 710 of lock assembly 700. Manual release lever cam surface 710B simultaneously displaces ball bearing 775 axially toward the gear motor housing of lock assembly 700 to depress gear shaft and pinion 731 to disengage the gear motor's clutch, allowing the pinion 731 to rotate freely. Once the gear motor clutch of lock assembly 700 is disengaged, lock bar spring 760 forces lock bar 720 to slide away from door panel lock striker assembly 600 and into a fully unlocked position. When manual release lever 11 is rotated to the fully unlocked position, manual release lever detent cam 11D engages manual release detent 45 to maintain the manual release linkage in the unlocked position. The door, being fully unlocked, can be pushed open by a passenger for manual egress.

While certain embodiments of the electric swing plug door operator were described in the foregoing detailed description, those skilled in the art may make modifications and alterations to these embodiments without departing from the scope and spirit of the invention. Accordingly, the foregoing description is intended to be illustrative rather than restrictive.

The invention claimed is:

1. An electric swing plug door operator for use on light to medium duty utility vehicles, said plug door operator comprising:

a door operator and base plate assembly affixed to the vehicle structure, said door operator including a drive linkage;

a shaft and arm assembly associated with the door operator drive linkage, said shaft and arm assembly adapted for rotation about a vertical axis, said shaft and arm assembly associated with a vehicle door panel such that rotation thereof causes opening and closing of the vehicle door panel;

a guide rod assembly associated with the door operator, said guide rod assembly adapted for controlling the angular orientation of the vehicle door panel with respect to a side of the vehicle during opening and closing;

a catch mounted to a leading edge or the vehicle door panel adapted for engaging a catch pad mounted to a vehicle portal opening, said catch adapted to constrain lateral displacement of the door panel leading edge in an outboard direction when the door panel is in a fully closed and locked position; and a remotely powered auxiliary lock mechanism.

2. The plug door operator of claim 1 including a manual release assembly.

3. The plug door operator of claim 2 wherein the manual release assembly includes a manual release cable associated with the door operator and the auxiliary lock mechanism.

4. The plug door operator of claim 1 wherein the door panel is attached to the shaft and arm assembly by a series of ball joint bearings attached to the arms of the shaft and arm assembly, said ball joint bearings allowing a rotational degree of freedom of the door and establishing the axis of rotation of the door relative to the shaft and arm assembly.

5. The plug door operator of claim 1 wherein the guide rod assembly has an adjustable length so as to bias a leading edge of the door panel slightly closer to the side of the vehicle than the trailing edge during opening and closing.

6. The plug door operator of claim 1 wherein the auxiliary lock mechanism includes a locking bar adapted for deployment to engage a lock striker mounted to the door panel trailing edge once the door reaches the fully closed position.

7. The plug door operator of claim 6 including an inductive proximity sensor for sensing a target on the lock striker and stopping deployment of the locking bar.

* * * * *

UNITED STATES PATENT AND TRADEMARK OFFICE

CERTIFICATE OF CORRECTION

PATENT NO. : 8,528,961 B2
APPLICATION NO. : 12/676986
DATED : September 10, 2013
INVENTOR(S) : Gregory S. Beck et al.

It is certified that error appears in the above-identified patent and that said Letters Patent is hereby corrected as shown below:

In the Claims

Column 9, Line 29, Claim 1, delete “or” and insert -- of --

Signed and Sealed this
Twenty-second Day of April, 2014

Michelle K. Lee

Michelle K. Lee
*Deputy Director of the United States Patent and Trademark Office*

UNITED STATES PATENT AND TRADEMARK OFFICE

CERTIFICATE OF CORRECTION

PATENT NO. : 8,528,961 B2
APPLICATION NO. : 12/676986
DATED : September 10, 2013
INVENTOR(S) : Beck et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 631 days.

Signed and Sealed this
Fifteenth Day of September, 2015

Michelle K. Lee

Michelle K. Lee
*Director of the United States Patent and Trademark Office*